United States Patent Office 3,361,813
Patented Jan. 2, 1968

3,361,813
ETHER-LINKED BASIC AMINES OF
TRIARYLACRYLAMIDES
Robert Edward Allen, Walnut Creek, and Laszlo Ambrus, Berkeley, Calif., assignors to Cutter Laboratories Inc., Berkeley, Calif., a corporation of Delaware
No Drawing. Filed July 2, 1964, Ser. No. 380,086
13 Claims. (Cl. 260—559)

ABSTRACT OF THE DISCLOSURE

Ether-linked basic amines of triarylacrylamides (aminolower-alkoxytriarylacrylamides), characterized by gonadotrophic inhibitory and uterotrophic activity, herbicidal and insecticidal activity; some compounds also exhibit antilipase or lipase inhibitory activity.

The present invention relates to derivatives of triarylacrylamides, and is more particularly concerned with ether-linked basic amines of triarylacrylamides (aminolower-alkoxytriarylacrylamides), a method for their preparation, compositions incorporating the novel compounds, and a method of treatment utilizing the active compounds of the invention and compositions containing the same.

The novel compounds of the present invention are the aminolower-alkoxytriarylacrylamides which may be represented by the formula:

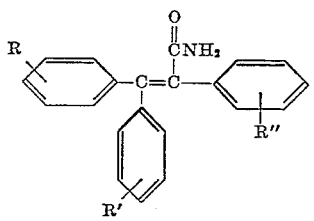

wherein R is selected from the group consisting of hydrogen, lower-alkyl, lower-alkoxy, halogen, trifluoromethyl, and dilower-alkylamino, and
wherein R' and R" are independently selected from the group consisting of hydrogen, lower-alkyl, lower-alkoxy, halogen, trifluoromethyl, dilower-alkylamino, hydroxy, and aminolower-alkoxy (—O—A—NR¹R²), in which A is lower-alkylene, and in which R¹ and R² are individually selected from the group consisting of lower-alkyl, phenyl and benzyl, and together with the nitrogen atom may represent piperidino, pyrrolidino, morpholino, piperazino, N-lower-alkylpiperazino, or mono or poly C-lower-alkyl derivatives thereof,
at least one of R' and R" being aminolower-alkoxy, acid addition salts thereof,
N-oxides thereof, and acid addition salts of N-oxides thereof.

Throughout the specification and claims, the terms lower-alkyl, lower-alkoxy, and dilower-alkylamino refer to the respective groups having a maximum of eight carbon atoms, preferably a maximum of four carbon atoms, in each lower-alkyl group thereof. A "lower-alkylene" group, as used herein, contains a maximum of eight carbon atoms, preferably a maximum of four carbon atoms, and is of straight or branched nature.

The preferred compounds are those in which only one of R' and R" is —O—A—NR¹R² and wherein A has a maximum of four carbon atoms. In the preferred compounds, in which only one of R' and R" is aminolower-alkoxy, the other of R' and R" as well as R is hydrogen or a para-substituent. The preferred amine groups —NR¹R² are those in which R¹ and R² are methyl or ethyl. The compounds of the invention can exist as cis or trans geometric isomers and such isomers are within the scope of the invention as well as the isomeric mixtures.

The compounds of the foregoing formula are characterized by gonadotrophic inhibitory and uterotrophic activity, and are accordingly useful in the treatment of conditions involving fertility and sterility problems in both males or females, especially those conditions arising from or subject to influence by female or male hormonal imbalance. The compounds are also useful as herbicides and insecticides. Some of the compounds also exhibit antilipase or lipase inhibitory activity.

The compounds of the present invention are prepared by reacting a phenolic hydroxy-containing triarylacrylamide, preferably in the form of a salt thereof, with an aminoalkyl halide to form a compound of Formula I.

The hydroxy-containing triarylacrylamide starting material has the following formula:

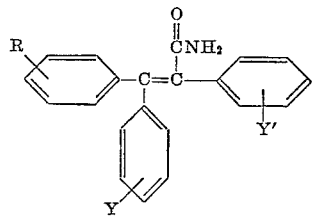

wherein R is selected from the group consisting of hydrogen, lower-alkyl, lower-alkoxy, halogen, trifluoromethyl, dilower, alkylamino, and
wherein Y and Y' are independently selected from the group consisting of hydrogen, lower-alkyl, lower-alkoxy, halogen, trifluoromethyl, dilower-alkylamino, and hydroxy, at least one of Y and Y' being hydroxy.

The hydroxy-containing triarylacrylamide starting material may be conveniently prepared by demethylation of a corresponding methoxy-substituted triphenylacrylonitrile by means of pyridine hydrochloride, preferably at the reflux temperature for pyridine hydrochloride, or by decomposition of a 2-tetrahydropyranyl ether derivative of the phenol by means of an aqueous acid such as dilute hydrochloric or sulfuric acid or the like. The latter method is preferable, particularly when one desires to obtain a phenolic intermediate where another non-phenolic phenyl group carries an alkoxy substituent. The methyl or tetrahydropyranyl ether intermediates are conveniently prepared by the condensation of a suitably substituted benzophenone with an appropriately substituted phenylacetonitrile. The condensation may be effected in inert solvents such as diethylether, benzene, toluene, dimethylformamide, or any combination of these, preferably at their reflux temperatures, using a basic catalyst such as sodium or potassium or lithium amide, hydride, or the metals themselves in a finely divided state in a solvent such as toluene or xylene.

The starting phenolic hydroxy-containing triarylacrylamides are then prepared by hydrolysis of the corresponding hydroxy-containing triarylacrylonitriles, which may be conveniently effected by refluxing with a strong base such as sodium or potassium hydroxide in a relatively high boiling alcohol containing water, such as a moist amyl alcohol, for a reaction period which may vary from about one to about ten hours.

The compounds of Formula II are preferably reacted, in the form of an alkali or alkaline earth metal salt thereof, with an aminoalkyl halide having the formula X—A—NR¹R², wherein X is halogen, A is lower-alkylene, R¹ and R² are independently selected from the group consisting of lower-alkyl, phenyl and benzyl, and together with the nitrogen may represent pyrrolidino, piperidino, morpholino, piperazino, N-methylpiperazino, or mono or poly C-lower-alkyl derivatives thereof. The alkylene radical A may be substituted by X at any suitable position, the particular position being determinative of whether A in Formula I is a straight or branched chain alkylene group.

According to one reaction procedure, the preformed phenolate, such as the sodium salt of a compound of Formula II, may be heated with the selected aminoalkyl halide either in the presence or absence of an added solvent at a suitable reaction temperature, e.g., usually about 60–150° centigrade, to yield the desired aminolower-alkoxy product. Alternatively, a mixture of the phenol and the aminoalkyl halide may be treated with a suitable alkali such as sodium methoxide, sodium ethoxide, sodium or potassium or calcium hydroxide, sodium or potassium carbonate, sodium hydride or amide, preferably in the presence of a suitable reaction solvent such as ethanol or other lower-alkanol, water, or an inert solvent such as benzene, toluene, xylene, or the like, at an elevated temperature, preferably at or about the boiling point of the solvent or combination of solvents employed. The reaction usually requires a period of several minutes to several hours, depending upon the exact reactants and reaction conditions employed. This procedure produces a metal phenolate in situ, which then condenses during the remaining stages of the reaction with the aminoalkyl-halide to produce the desired aminolower-alkoxy product.

When a starting material of Formula II is used, in which both Y and Y' are alkali metal phenolate groups, and a smaller amount of X—A—NR$^1$R$^2$ is used than that required to react completely with both phenolate groups, either R' or R'' of the final product of Formula I may be a hydroxy group. When an excess of the second reactant is employed, both phenolate groups are converted to aminolower-alkoxy groups.

The compounds of the invention are most conveniently employed in the form of non-toxic acid-addition salts. Such salts also have improved water-solubility. Although the non-toxic salts are preferred, any salt may be prepared for use as a chemical intermediate, as in the preparation of another but non-toxic acid-addition salt. The free basic compounds may be conveniently converted to their acid addition salts by reaction of the free base with the selected acid, preferably in the presence of an organic solvent inert to the reactants and reaction products under the conditions of the reaction. The acids which can be used to prepare the preferred non-toxic acid addition salts are those which produce, when combined with the free bases, salts the anions of which are relatively innocuous to the animal organism in therapeutic doses of the salts, so that beneficial physiological properties inherent in the free bases are not vitiated by side-effects ascribable to the anions.

Appropriate acid-addition salts are those derived from mineral acids such as hydrochloric acid, hydrobromic acid, hydroiodic acid, nitric acid, sulfuric acid, and phosphoric acid; and organic acids such as acetic acid, citric acid, lactic acid, fumaric acid, and tartaric acid. The preferred acid addition salt is the hydrochloride.

The acid-addition salts are prepared either by dissolving the free base in an aqueous solution containing the appropriate acid and isolating the salt by evaporating the solution, or by reacting the free base and the selected acid in an organic solvent, in which case the salt ordinarily separates directly or can be conventionally recovered by concentration of the solution or the like. Conversely the free base may be obtained conventionally by neutralizing the acid-addition salt with an appropriate base such as sodium hydroxide, sodium carbonate or the like, extracting the liberated base with a suitable solvent, illustratively ethyl acetate or benzene, drying the extract and evaporating to dryness or fractionally distilling, or in other conventional manner.

When there are two or more basic nitrogen atoms present in the compounds of the invention, poly-acid-addition salts may be obtained by employing the proper increased molar ratios of acid to the free base.

Similarly, N-oxides and acid addition salts of N-oxides of the free bases of the invention may be prepared according to the procedure set forth in Example 16 and immediately following, and such N-oxides and acid addition salts of N-oxides are also included within the scope of the present invention. In addition to the activities, properties, and uses of the other compounds of the present invention, the N-oxides and acid addition salts of N-oxides of the present invention exhibit anti-lipase or lipase-inhibitory activity.

The starting phenolic hydroxy-containing triarylacrylamides, most of which are new compounds, are prepared as follows:

*Preparation 1.—3,3-diphenyl-2-(4-hydroxyphenyl)-acrylamide*

One hundred ten grams (0.61 mole) of benzophenone and 40 grams (0.9 mole) of sodium hydride dispersion (53 percent in mineral oil) are suspended in 300 milliliters of dry benzene. To this stirred suspension, heated to reflux, is added a solution of 90 grams (0.61 mole) of 4-methoxyphenylacetonitrile in 200 milliliters of dry benzene over a one-hour period. The reaction mixture is refluxed for four additional hours at the end of which time hydrogen evolution has practically ceased. The reaction mixture is kept at room temperature for sixteen hours and the excess hydride cautiously decomposed with water. The organic layer is washed several times with water, dried over anhydrous magnesium sulfate, filtered, and the solvent removed under reduced pressure. The residue is taken up in a minimum amount of hot ethanol. 3,3-diphenyl-2-(4-methoxyphenyl)acrylonitrile is obtained as yellow needles melting at about 148–149° centigrade.

Ninety grams (0.29 mole) of 3,3-diphenyl-2-(4-methoxyphenyl)acrylonitrile and 126 grams (1.1 moles) of pyridine hydrochloride are refluxed for thirty minutes. The reaction mixture is cooled and diluted with water. The crude material is filtered and dissolved in one liter of five percent warm sodium hydroxide solution, the solution is filtered, and the filtrate is acidified with one liter of five percent hydrochloric acid. The precipitate is filtered and dissolved in a minimum amount of hot ethanol. 3,3-diphenyl-2-(4-hydroxyphenyl)acrylonitrile is obtained as yellow crystals melting at about 229–230° centigrade.

*Analysis.*—Calculated for $C_{21}H_{15}NO$: C, 84.80; H, 5.08; N, 4.71. Found: C, 85.00; H, 4.61; N, 4.57.

This compound can also be obtained by acid decomposition of 3,3-diphenyl-2-[4-(tetrahydropyran-2-yloxy)-phenyl]-acrylonitrile which is prepared by the condensation of benzophenone with 4-(tetrahydropyran-2-yloxy)-phenylacetonitrile (procedure of Preparation 3) to give 3,3 - diphenyl - 2 - [4-(tetrahydropyran-2-yloxy)phenyl]-acrylonitrile, melting at about 143–144° centigrade. The compound has uterotrophic and gonadotrophic inhibitory activities.

*Analysis.*—Calculated for $C_{26}H_{23}NO_2$: C, 81.86; H, 6.08; N, 3.67. Found: C, 81.60; H, 6.08; N, 3.69.

A mixture of 29.7 grams (0.10 mole) of 3,3-diphenyl-2-(4-hydroxyphenyl)acrylonitrile and 120 grams (3.0 moles) of sodium hydroxide in 400 grams of isoamyl alcohol is refluxed for three hours. The mixture is cooled, a solid separates and is collected on a filter, dissolved in about 500 milliliters of warm water and re-precipitated by diluting with excess ten percent hydrochloric acid. The collected precipitate is washed with water and crystallized from a minimum of hot (100° centigrade) acetic acid to give white needles of 3,3-diphenyl-2-(4-hydroxyphenyl)-acrylamide, melting at about 284–285° centigrade.

*Analysis.*—Calculated for $C_{21}H_{17}NO_2$: C, 80.00; H, 5.43; N, 4.44. Found: C, 79.72; H, 5.55; N, 4.55.

*Preparation 2.—2-(4-hydroxyphenyl)-3,3-bis(4-tolyl)-acrylamide*

By the procedure described in Preparation 1, 4,4'-dimethylbenzophenone is allowed to react with 4-methoxyphenylacetonitrile to give 2-(4-methoxyphenyl)-3,3-bis-(4-tolyl)acrylonitrile, yellow crystals when crystallized from isopropanol, melting at about 146–148° centigrade.

*Analysis.*—Calculated for $C_{24}H_{21}NO$: C, 84.95; H, 6.23; N, 4.12. Found: C, 84.52; H, 6.76; N, 3.91.

By treating 2 - (4 - methoxyphenyl)-3,3-bis(4-tolyl)-acrylonitrile with pyridine hydrochloride according to the procedure of Preparation 1, 2-(4-hydroxyphenyl)-3,3-bis(4-tolyl)acrylonitrile is obtained as yellow crystals melting at about 229–230° centigrade.

*Analysis.*—Calculated for $C_{23}N_{19}NO$: C, 84.90; H, 5.88; N, 4,31. Found: C, 84.74; H, 5.69; N, 4.70.

By the procedure described in Preparation 1, a mixture of 2-(4-hydroxyphenyl)-3,3-bis(4-tolyl)acrylonitrile and sodium hydroxide in isoamyl alcohol is refluxed for about three hours, cooled, and the product filtered, converted to the phenol by acidification, and recrystallized, to give white needles of 2-(4-hydroxyphenyl)-3,3-bis(4-tolyl)acrylamide, melting at about 254–255° centigrade.

*Analysis.*—Calculated for $C_{23}H_{21}NO_2$: C, 80.44; H, 6.16; N. 4.08. Found: C, 80.23; H, 6.11; N, 4.15.

*Preparation 3.—2-(4-hydroxyphenyl)-3,3-bis(4-methoxyphenyl)acrylamide*

A mixture of 160 grams (1.2 moles) of 4-hydroxyphenylacetonitrile and 103 grams (1.3 moles) of dihydropyran is dissolved in 500 milliliters of dry benzene and two milliliters of concentrated hydrochloric acid added. The reaction mixture is refluxed for four hours and kept at room temperature for sixteen hours. The organic layer is washed several times with 200-milliliter portions of five percent sodium hydroxide solution and with water until neutral. The organic layer is dried over magnesium sulfate, filtered, and the solvent removed under reduced pressure. The oily residue is crystallized from an ether-pentane (1 to 3) mixture to give 4-(tetrahydropyran-2-yloxy)phenylacetonitrile, yellow crystals melting at about 64–66° centigrade.

To a refluxing suspension of 70 grams (1.8 moles) of sodium amide and 150 milliliters of benzene is added a solution of 154 grams (0.72 mole) of 4-(tetrahydropyran-2-yloxy)phenylacetonitrile in 500 milliliters of dry benzene over a three-hour period. The reaction mixture is refluxed for one additional hour at the end of which time the ammonia evolution has practically ceased. With stirring, a hot solution of 174 grams (0.72 mole) of 4,4'-dimethoxybenzophenone in two liters of benzene is added. After two additional hours at reflux, the reaction mixture is kept at room temperature for sixteen hours and the excess sodium amide is cautiously decomposed with water. The organic layer is washed several times with water, dried over anhydrous magnesium sulfate, filtered, and the solvent removed under reduced pressure. The oily residue is triturated with a warm mixture of one liter ethanol and 500 milliliters of petroleum ether (B.P. 60–68° centigrade) from which a yellow solid, melting at about 202–206° centigrade, is obtained by evaporation. This solid is dissolved in 500 millilters of boiling glacial acetic acid containing three drops of concentrated sulfuric acid and slowly diluted with water until yellow needles separate (about 800 milliliters of water is needed). 2 - (4 - hydroxyphenyl) - 3,3 - bis(4-methoxyphenyl)acrylonitrile is obtained as yellow crystals melting at about 217–219° centigrade.

*Analysis.*—Calculated for $C_{23}H_{19}NO_3$: C, 77.29; H, 5.36; N, 3.92. Found: C, 77.38; H, 5.34; N, 3.81.

By the procedure described in Preparation 1, a mixture of 2-(4-hydroxyphenyl)-3,3-bis(4-methoxyphenyl)acrylonitrile and sodium hydroxide in isoamyl alcohol is refluxed for about three hours, cooled, and the product filtered, converted to the phenol by acidification, and recrystallized, to give 2-(4-hydroxyphenyl)-3,3-bis(4-methoxyphenyl)acrylamide.

*Preparation 4.—3,3-bis(4-chlorophenyl)-2-(4-hydroxyphenyl)acrylamide*

By the procedure described in Preparation 3, 4,4'-dichlorobenzophenone is allowed to react with 4-(tetrahydropyran-2-yloxy)phenylacetonitrile to give 3,3-bis(4-chlorophenyl)-2-(4-hydroxyphenyl)acrylonitrile, yellow crystals when crystallized from acetic acid, melting at about 252–254° centigrade.

*Analysis.*—Calculated for $C_{21}H_{13}Cl_2NO$: C, 68.88; H, 3.58; N, 3.82. Found: C, 68.80; H, 3.58; N, 3.85.

By the procedure described in Preparation 1, a mixture of 3,3-bis(4-chlorophenyl)-2-(4 - hydroxyphenyl)acrylonitrile and sodium hydroxide in isoamyl alcohol is refluxed for about three hours, cooled, and the product filtered, converted to the phenol by acidification, and recrystallized, to give 3,3-bis(4-chlorophenyl)-2-(4-hydroxyphenyl)acrylamide.

*Preparation 5.—2,3-diphenyl-3-(4-hydroxyphenyl)acrylamide*

A mixture of 100 grams (0.505 mole) of 4-hydroxybenzophenone and 50 grams (0.595 mole) of dihydropyran is dissolved in 500 milliliters of warm dry benzene and two milliliters of concentrated hydrochloric acid is added. The reaction mixture is refluxed for four hours and then kept at room temperature for sixteen hours. The organic layer is washed several times with 200-milliliter portions of five percent sodium hydroxide solution and with water until neutral. The organic layer is dried over magnesium sulfate, filtered, and the solvent removed under reduced pressure to give a yellow oil, which is dissolved in pentane to give white crystals of 4-(tetrahydropyran-2-yloxy)benzophenone, melting at about 49–51° centigrade.

*Analysis.*—Calculated for $C_{18}O_{18}O_3$: C, 76.60; H, 6.43. Found: C, 76.65; H, 6.44.

To a refluxing suspension of eight grams (0.205 mole) of sodium amide in 200 milliliters of diethyl ether is added a solution of 11.4 grams (0.1 mole) of phenylacetonitrile in 200 milliliters of diethyl ether over a two-hour period. The reaction mixture is refluxed for one additional hour, at the end of which time the ammonia evolution has practically ceased. With stirring, a solution of 28 grams (0.1 mole) of 4-(tetrahydropyran-2-yloxy)benzophenone in 100 milliliters of diethyl ether is added. After two additional hours reflux, the reaction mixture is kept at room temperature for sixteen hours and the excess sodium amide cautiously decomposed with water. The organic layer is washed several times with water, dried over anhydrous magnesium sulfate, filtered and the solvent removed under reduced pressure. The residual oil is dissolved in methanol from which white crystals of 2,3 - diphenyl-3-[4-(tetrahydropyran-2-yloxy)phenyl] acrylonitrile separate, melting over a range from 118–144° centigrade. The compound has uterotrophic and gonadotrophic inhibitory activities.

*Analysis.*—Calculated for $C_{26}H_{23}NO_2$: C, 81.86; H, 6.08; N, 3.67. Found: C, 82.15; H, 6.25; N, 3.87.

These crystals are dissolved in 100 milliliters of boiling glacial acetic acid containing three drops of concentrated sulfuric acid and slowly diluted with water until yellow needles separate (about 250 milliliters of water is needed). 2,3 - diphenyl - 3 - (4 - hydroxyphenyl)acrylonitrile is obtained as yellowish crystals melting at about 207–208° centigrade.

By the procedure described in Preparation 1, a mixture of 2,3 - diphenyl-3-(4 - hydroxyphenyl)acrylonitrile and sodium hydroxide in isoamyl alcohol is refluxed for about three hours, cooled, and the product filtered, converted to the phenol by acidification, and recrystallized, to give 2,3-diphenyl-3-(4-hydroxyphenyl)acrylamide.

*Preparation 6.—3-(4-hydroxyphenyl)-2-(4-methoxyphenyl)-3-phenylacrylamide*

By the procedure described in Preparation 5, 4-(tetrahydropyran-2-yloxy)benzophenone is allowed to react with 4-methoxyphenylacetonitrile to give 3-(4-hydroxyphenyl)-2-(4-methoxyphenyl)-3-phenylacrylonitrile, yellowish crystals when crystallized from acetic acid, melting at about 189–191° centigrade.

*Analysis.*—Calculated for $C_{22}H_{17}NO_2$: C, 80.73; H, 5.24; N, 4.28. Found: C, 80.10; H, 5.32; N, 4.46.

By the procedure described in Preparation 1, a mixture of 3-(4-hydroxyphenyl)-2-(4-methoxyphenyl)-3-phenylacrylonitrile and sodium hydroxide in isoamyl alcohol is refluxed for about three hours, cooled, and the product filtered, converted to the phenol by acidification, and recrystallized, to give 3-(4-hydroxyphenyl)-2-(4-methoxyphenyl)-3-phenylacrylamide.

*Preparation 7.—2-(4-chlorophenyl)-3-(4-hydroxyphenyl)-3-phenylacrylamide*

By the procedure described in Preparation 5, 4-(tetrahydropyran-2-yloxy)-benzophenone is allowed to react with 4-chlorophenylacetonitrile. The ether is removed and the reaction mixture is extracted with hexane from which a crop of crystals separate. These are recrystallized from ethanol to give one of the geometric forms of 2-(4-chlorophenyl)-3-phenyl-3-[4-(tetrahydropyran-2-yloxy)-phenyl]acrylonitrile, melting at about 183–184° centigrade.

*Analysis.*—Calculated for $C_{26}H_{22}ClNO_2$: C, 75.10; H, 5.33; N, 3.37. Found: C, 75.00; H, 5.42; N, 3.43.

The oily residue from the above hexane mother liquor and the crystals of tetrahydropyranyl derivative are treated separately in glacial acetic acid to give the two geometric forms of 2-(4-chlorophenyl)-3-(4-hydroxyphenyl)-3-phenylacrylonitrile, melting at about 175–177° and 187–189° centigrade, respectively.

*Analysis.*—Calculated for $C_{21}H_{14}ClNO$: C, 76.03; H, 4.25; N, 4.22. Found, respectively: C, 76.18; H, 4.29; N, 4.11; C, 76.07; H, 4.62; N, 4.12.

By the procedure described in Preparation 1, a mixture of 2-(4-chlorophenyl)-3-(4-hydroxyphenyl)-3-phenylacrylonitrile and sodium hydroxide in isoamyl alcohol is refluxed for about three hours, cooled, and the product filtered, converted to the phenol by acidification, and recrystallized, to give 2-(4-chlorophenyl)-3-(4-hydroxyphenyl)-3-phenylacrylamide.

*Preparation 8.—3,3-bis(4-dimethylaminophenyl)-2-(4-hydroxyphenyl)acrylamide*

By the procedure described in Preparation 3, 4,4'-bis(dimethylamino)benzophenone is allowed to react with 4-(tetrahydropyran-2-yloxy)phenylacetonitrile to give 3,3-bis(4-dimethylaminophenyl)-2-[4-(tetrahydropyran-2-yloxy)phenyl]acrylonitrile, yellow crystals when crystallized from dimethylformamide-ethanol (1:20), melting at about 189–191° centigrade.

*Analysis.*—Calculated for $C_{30}H_{33}N_3O_2$: C, 77.05; H, 7.11; N, 8.99. Found: C, 76.82; H, 7.23; N, 8.88.

The tetrahydropyranyl derivative dissolved in dimethylformamide is decomposed with excess 30 percent sulfuric acid and, upon neutralization with diethylamine, orange crystals of 3,3-bis(4-dimethylaminophenyl)-2-(4-hydroxyphenol)acrylonitrile are obtained, melting at about 240–242° centigrade.

*Analysis.*—Calculated for $C_{25}H_{25}N_3O$: C, 78,29; H, 6.57; N, 10.95. Found: C, 77.80; H, 6.76; N, 10.78.

By the procedure described in Preparation 1, a mixture of 3,3-bis-(4-dimethylaminophenyl)-2-(4-hydroxyphenyl)-acrylonitrile and sodium hydroxide in isoamyl alcohol is refluxed for about three hours, cooled, and the product filtered, converted to the phenol by acidification, and recrystallized, to give 3,3-bis(4-dimethylaminophenyl)-2-(4-hydroxyphenyl)acrylamide.

*Preparation 9.—2,3-bis(4-hydroxyphenyl)-3-phenylacrylamide*

By the procedure described in Preparation 5, 4-(tetrahydropyran-2-yloxy)benzophenone is allowed to react with 4-(tetrahydropyran-2-yloxy)phenyl acetonitrile. The ether is removed and the reaction mixture is dissolved in ethanol, from which a crop of crystals separate. These are recrystallized from dimethylformamide to give one of the geometric forms of 3-phenyl-2,3-bis[4-(tetrahydropyran-2-yloxy)phenyl]-acrylonitrile, melting at about 189–191° centigrade.

*Analysis.*—Calculated for $C_{31}H_{31}NO_4$: C, 77.31; H, 6.49; N, 2.91. Found: C, 76.75; H, 6.68; N, 3.28.

The oily residue from the above ethanol mother liquor and the crystals of the tetrahydropyranyl derivative are treated separately in glacial acetic acid to give the two geometric forms of 2,3-bis(4-hydroxyphenyl)-3-phenylacrylonitrile, melting at about 263–264° and 261–262° centigrade, respectively.

*Analysis.*—Calculated for $C_{21}H_{15}NO_2$: C, 80.51; H, 4.83; N, 4.47. Found, respectively: C, 80.20; H, 4.96; N, 4.31; C, 80.56; H, 4.98; N. 4.22.

By the procedure described in Preparation 1, a mixture of 2,3-bis(4-hydroxyphenyl)-3-phenylacrylonitrile and sodium hydroxide in isoamyl alcohol is refluxed for about three hours, cooled and the product filtered, converted to the phenol by acidification, and recrystallized, to give 2,3-bis(4-hydroxyphenyl)-3-phenylacrylamide.

*Preparation 10.—2,3-diphenyl-3-(2-hydroxyphenyl)-acrylamide*

Using 2-hydroxybenzophenone in place of 4-hydroxybenzophenone in the procedure of Preparation 5, 2,3-diphenyl-3-(2-hydroxyphenyl)acrylonitrile is obtained as yellow crystals.

By the procedure described in Preparation 1, a mixture of 2,3-diphenyl-3-(2-hydroxyphenyl)acrylonitrile and sodium hydroxide in isoamyl alcohol is refluxed for about three hours, cooled, and the product filtered, converted to the phenol by acidification, and recrystallized, to give 2,3-diphenyl-3-(2-hydroxyphenyl)acrylamide.

*Preparation 11.—2-(4-hydroxyphenyl)-3,3-bis(4-trifluoromethylphenyl)acrylamide*

By the procedure described in Preparation 1, 4,4'-bis-(trifluoromethyl)benzophenone is allowed to react with 4-methoxyphenylacetonitrile to give 2-(4-methoxyphenyl)-3,3-bis(4-trifluoromethylphenyl)acrylonitrile.

By treating 2-(4-methoxyphenyl)-3,3-bis(4-trifluoromethylphenyl)acrylonitrile with pyridine hydrochloride according to the procedure of Prepartion 1, 2-(4-hydroxyphenyl)-3,3-bis(4-trifluoromethyl)acrylonitrile is obtained.

By the procedure described in Preparation 1, a mixture of 2-(4-hydroxyphenyl)-3,3-bis(4-trifluoromethylphenyl)-acrylonitrile and sodium hydroxide in isoamyl alcohol is refluxed for about three hours, cooled, and the product filtered, converted to the phenol by acidification, and recrystallized, to give 2-(4-hydroxyphenyl)-3,3-bis(4-trifluoromethylphenyl)acrylamide.

Where the foregoing preparations produce a compound having a methyl or other lower-alkyl group, it is to be understood that compounds containing other lower-alkyl groups of straight or branched nature and containing up to eight carbon atoms inclusive, such as methyl, ethyl, propyl, isopropyl, butyl, sec.-butyl, t.-butyl, amyl, isoamyl, hexyl, heptyl, and octyl, are prepared in the same manner by substitution in the process of the appropriate different lower-alkyl starting material. Likewise, where chloro or other halogen atom is present, although chlorine is preferred, further halogen compounds including iodo, bromo, chloro, and fluoro compounds are prepared starting from the appropriate halogenated starting material. Similarly, where methoxy or other lower-alkoxy group is present, compounds having other lower-alkoxy groups containing various lower-alkyl groups having up to eight carbon atoms inclusive are prepared in the same manner from the appropriate different lower-alkoxy starting material. Moreover when one dilower-alkylamino group, such as the dimethylamino group, is present in a compound, other dilower-alkylamino compounds are prepared in the same manner starting only with the selected different dilower-alkylamino compound. In the same manner, ortho and meta substituted compounds are produced instead of the para by utilizing the selected ortho or meta substituted starting compound. Similarly, other molecular changes are readily made.

The following examples are given by way of illustration only and are not to be construed as limiting.

*Example 1.—2-[4-(2-diethylaminoethoxy)phenyl]-3,3-diphenylacrylamide hydrochloride*

A mixture of 21 grams (0.067 mole) of 3,3-diphenyl-2-(4-hydroxyphenyl)acrylamide and 3.6 grams (0.067 mole) of sodium methoxide in 200 milliliters of ethanol is heated to reflux. While stirring, a solution of 9.2 grams (0.068 mole) of 2-diethylaminoethyl chloride in 75 milliliters of toluene is added over a period of thirty minutes and refluxing is continued for three additional hours. Most of the solvent is allowed to distill from the reaction mixture which is then diluted with about 300 milliliters of ether, washed successively with water, 100 milliliters of five percent sodium hydroxide solution, and several times with water. The organic layer is dried over anhydrous magnesium sulfate and filtered. The filtrate is concentrated under reduced pressure to a yellow oil which is taken up in 200 milliliters of isopropanol and acidified to about pH 3 with ethereal hydrogen chloride solution. The crystalline hydrochloride salt which precipitates is recrystallized from isopropanol, giving the pure hydrochloride salt melting at about 104° centigrade. The compound has uterotrophic and gonadotrophic inhibitory activities.

*Analysis.*—Calculated for $C_{27}H_{30}N_2O_2 \cdot HCl$: C, 71.90; H, 6.93; N, 6.21. Found: C, 71.90; H, 7.10; N, 6.40.

*Example 2.—2-[4-(2-diethylaminoethoxy)phenyl]-3,3-bis(4-tolyl)acrylamide hydrochloride*

By the procedure described in Example 1, 2-(4-hydroxyphenyl)-3,3-bis(4-tolyl)acrylamide is allowed to react with 2-diethylaminoethyl chloride to give 2-[4-(2-diethylaminoethoxy)phenyl]-3,3-bis(4 - tolyl)acrylamide hydrochloride, melting at about 177–178° centigrade.

*Analysis.*—Calculated for $C_{29}H_{34}N_2O_2 \cdot HCl$: C, 72.70; H, 7.37; N, 5.85. Found: C, 72.47; H, 7.27; N, 5.91.

*Example 3.—3,3-bis(4-chlorophenyl)-2-[4-(2-diethylaminoethoxy)phenyl]acrylamide hydrochloride*

By the procedure of Example 1, 3,3-bis(4-chlorophenyl)-2-(4-hydroxyphenyl)acrylamide is allowed to react with 2-diethylaminoethyl chloride to give 3,3-bis(4-chlorophenyl) - 2 - [4 - (2 - diethylaminoethoxy)phenyl] acrylamide hydrochloride.

*Example 4.—2-[4-(2-diethylaminoethoxy)phenyl]3,3-bis(4-methoxyphenyl)acrylamide hydrochloride*

By the procedure of Example 1, 2-(4-hydroxyphenyl)-3,3-bis(4-methoxyphenyl)acrylamide is allowed to react with 2-diethylaminoethyl chloride to give 2-[4-(2-diethylaminoethoxy)phenyl]-3,3 - bis(4 - methoxyphenyl) acrylamide hydrochloride.

*Example 5.—2-[4-(2-dimethylaminoethoxy)phenyl]-3,3-diphenylacrylamide hydrochloride*

By the procedure of Example 1, 3,3-diphenyl-2-(4-hydroxyphenyl)acrylamide is allowed to react with 2-dimethylaminoethyl chloride to give 2-[4-(2-dimethylaminoethoxy)phenyl]3,3-diphenylacrylamide hydrochloride.

*Example 6.—2-[4-(3-dimethylaminopropoxy)phenyl]-3,3-diphenylacrylamide hydrochloride*

By the procedure of Example 1, 3,3-diphenyl-2-(4-hydroxyphenyl)acrylamide is allowed to react with 3-dimethylaminopropyl chloride to give 2-[4-(3-dimethylaminopropoxy)phenyl] - 3,3 - diphenylacrylamide hydrochloride.

*Example 7.—3,3-diphenyl-2-[4-(2-piperidinoethoxy)phenyl]acrylamide hydrochloride*

By the procedure of Example 1, 3,3-diphenyl-2-(4-hydroxyphenyl)acrylamide is allowed to react with 2-piperidinoethyl chloride to give 3,3-diphenyl-2-[4-(2-piperidinoethoxy)phenyl]acrylamide hydrochloride.

*Example 8.—3,3-diphenyl-2-[4-(2-pyrrolidinoethoxy)phenyl]acrylamide hydrochloride*

By the procedure of Example 1, 3,3-diphenyl-2-(4-hydroxyphenyl)acrylamide is allowed to react with 2-pyrrolidinoethyl chloride to give 3,3-diphenyl-2-[4-(2-pyrrolidinoethoxy)phenyl]acrylamide hydrochloride.

*Example 9.—3-[4-(2-diethylaminoethoxy)phenyl]-2,3-diphenylacrylamide hydrochloride*

By the procedure of Example 1, 2,3-diphenyl-3-(4-hydroxyphenyl)acrylamide is allowed to react with 2-diethylaminoethyl chloride to give 3-[4-(2-diethylaminoethoxy)phenyl]-2,3-diphenylacrylamide hydrochloride.

*Example 10.—3-[4-(2-diethylaminaethoxy)phenyl]-2-(4-methoxyphenyl)-3-phenylacrylamide hydrochloride*

By the procedure of Example 1, 3-(4-hydroxyphenyl)-2-(4-methoxyphenyl)-3-phenylacrylamide is allowed to react with 2-diethylaminoethyl chloride to give 3-[4-(2-diethylaminoethoxy)phenyl]-2 - (4 - methoxyphenyl) - 3 - phenylacrylamide hydrochloride.

*Example 11.—2-(4-chlorophenyl)-3-[4-(2-diethylaminoethoxy)phenyl]-3-phenylacrylamide hydrochloride*

By the procedure of Example 1, 2-(4-chlorophenyl)-3-(4-hydroxyphenyl-3-phenylacrylamide is allowed to react with 2-diethylaminoethyl chloride to give 2-(4-chlorophenyl)-3-[4-(2-diethylaminoethoxy)phenyl] - 3 - phenylacrylamide hydrochloride.

*Example 12.—2-[4-(2-diethylaminoethoxy)phenyl]-3,3-bis(4-dimethylaminophenyl)acrylamide hydrochloride*

By the procedure of Example 1, 3,3-bis(4-dimethylaminophenyl)-2-(4-hydroxyphenyl)acrylamide is allowed to react with 2-diethylaminoethyl chloride to give 2-[4-(2-diethylaminoethoxy)phenyl]-3,3 - bis(4 - dimethylaminophenyl)acrylamide hydrochloride.

*Example 13.—2,3-bis[4-(2-diethylaminoethoxy)phenyl]-3-phenylacrylamide dihydrochloride*

By the procedure described in Example 1, fifteen parts of 2,3-bis(4-hydroxyphenyl)-3-phenylacrylamide is first treated with five parts of sodium methoxide, then followed by thirteen parts of 2-diethylaminoethyl chloride to give 2,3 - bis[4-(2-diethylaminoethoxy)phenyl]-3-phenylacrylamide dihydrochloride.

*Example 14.—3-[2-(2-diethylaminoethoxy)phenyl]-2,3-diphenylacrylamide hydrochloride*

By the procedure described in Example 1, 2,3-diphenyl-3-(2-hydroxyphenyl)acrylamide is allowed to react with 2-diethylaminoethyl chloride to give 3-[2-(2-diethylaminoethoxy)phenyl] - 2,3 - diphenylacrylamide hydrochloride.

*Example 15.—2-[4-(2-diethylaminoethoxy)phenyl]-3,3-bis(4-trifluoromethylphenyl)acrylamide*

By the procedure described in Example 1, 2-(4-hydroxyphenyl) - 3,3 - bis(4 - trifluoromethylphenyl)acrylamide is allowed to react with 2-diethylaminoethyl chloride to give 2-[4 - (2 - diethylaminoethoxy)phenyl]-3,3-bis(4-trifluoromethylphenyl)acrylamide hydrochloride.

Although in this example both R and R', as designated in Formula I above, are trifluoromethyl, compounds wherein only one, or any other combination of two of R, R' and R'' are trifluoromethyl, are produced from the corresponding hydroxy-containing starting material.

*Example 16.—2-[4-(2 - diethylaminoethoxy)phenyl]-3,3-diphenylacrylamide N - oxide and the hydrochloride thereof*

2 - [4 - (2 - diethylaminoethoxy)phenyl]-3,3-diphenylacrylamide (0.028 mole) (Example 1) is dissolved in about 300 milliliters of methanol and treated with about ten milliliters of 30 percent hydrogen peroxide solution. The reaction mixture is kept at room temperature for about 20 hours. The solvent is removed under reduced pressure at room temperature, the residual oil is taken up in 100 milliliters of ethyl acetate and acidified to about pH 2 with alcoholic hydrogen chloride solution. The white crystals are recrystallized from ethanol to give 2 - [4 - (2 - diethylaminoethoxy)phenyl] - 3,3 - diphenylacrylamide N-oxide hydrochloride, which melts with decomposition. The compound has anti-lipase or lipase-inhibitory activity.

The N-oxide free base is obtained by working up the product of the hydrogen peroxide reaction and separating the same without prior acidification, preferably with the use of a filter aid and filtration, the product usually being obtained as a gummy substance upon concentration of the product by warming under a stream of nitrogen.

In place of the free base of Example 1, as starting material in the procedure of Example 16, there may be substituted any of the other free bases of the other examples of this specification.

In place of hydrochloric acid as used in Example 16, there may be substituted other appropriate acids to obtain the corresponding acid addition salt of the N-oxide of the selected free base, for example, the hydrobromide, the hydroiodide, the sulfate, the phosphate, the nitrate, the acetate, the benzoate, the salicylate, the glycolate, the succinate, the nicotinate, the tartrate, the maleate, the malate, the lactate, and the like, or any other acid addition salt as already set forth in the foregoing for the non-N-oxide compounds of the invention.

In this manner there are obtained the N-oxides of any of the free bases of the foregoing examples, and selected acid-addition salts of the N-oxides of the free bases of the foregoing examples.

Where the foregoing examples produce a compound having a methyl or other lower-alkyl group, it is to be understood that compounds containing other lower-alkyl groups of straight or branched nature and containing up to eight carbon atoms inclusive, such as methyl, ethyl, propyl, isopropyl, butyl, sec.-butyl, t.-butyl, amyl, isoamyl, hexyl, heptyl, and octyl, are prepared in the same manner by substitution in the process of the appropriate different lower-alkyl starting material. Lower-alkylene groups in the compounds thus produced may be varied in the same manner, and may be, for example, ethylene, propylene, butylene, isobutylene, or the like. Likewise, where chloro or other halogen atom is present, although chlorine is preferred, further halogen compounds including iodo, bromo, chloro, and fluoro compounds are prepared starting from the appropriate halogenated starting material. Similarly, where methoxy or other lower-alkoxy group is present, other compounds having lower-alkoxy groups containing various lower-alkyl groups having up to eight carbon atoms inclusive are prepared in the same manner from the appropriate different lower-alkoxy starting material. Moreover, when one dilower-alkyl-amino group, such as the dimethylamino group, is present in a compound, other dilower-alkylamino compounds are prepared in the same manner starting only with the selected different dilower-alkylamino compound. In the same manner, ortho and meta substituted compounds are produced instead of the para by utilizing the selected ortho or meta substituted starting compound. Similarly, other molecular changes within the scope of the invention are readily made.

The compounds of the invention are generally characterized by the pharmacological activity hereinbefore stated, making them useful in counteracting certain physiological abnormalities in a living animal body. Effective quantities of the pharmacologically active compounds of the invention may be administered to a living animal body in any one of various ways, for example, orally as in capsules or tablets, parenterally in the form of sterile solutions, suspensions, or by pellet implantation, and in some cases intravenously in the form of sterile solutions. Other modes of administration are cutaneously, subcutaneously, buccally, intramuscularly, and intraperitoneally.

Pharmaceutical formulations are usually prepared from a predetermined quantity of one or more of the compounds of the invention, preferably in solid form. Such formulations may take the form of powders, elixirs, solutions, pills, capsules, pellets, or tablets, with or without, but preferably with, any one of a large variety of pharmaceutically acceptable vehicles or carriers. When in admixture with a pharmaceutical vehicle or carrier, the active ingredient usually comprises from about 0.01 to about 75 percent, normally from about 0.05 to about 15 percent, by weight of the composition. Carriers such as starch, sugar, talc, commonly used synthetic and natural gums, water, and the like, may be used in such formulations. Binders such as gelatin, and lubricants such as sodium stearate, may be used to form tablets. Disintegrating agents such as sodium bicarbonate may also be included in tablets.

Although relatively small quantities of the active materials of the invention, even as low as 0.1 milligram, may be used in cases of administration to subjects having a relatively low body weight, unit dosages are usually five milligrams or above and preferably twenty-five, fifty, or one-hundred milligrams or even higher, depending of course upon the subject treated and the particular result desired. Broader ranges appear to be one to 500 milligrams per unit dose. The active agents of the invention may be combined for administration with other pharmacologically active agents, such as analgesics, sedatives, tranquilizers, adrenal or progestational or estrogenic steroids or hormones, or the like, or with buffers, antacids or the like, and the proportion of the active agent or agents in the compositions may be varied widely. It is only necessary that the active ingredient of the invention constitute an effective amount, i.e., such that a suitable effective dosage will be obtained consistent with the dosage form employed. Obviously, several unit dosage forms may be administered at about the same time. The exact individual dosages as well as daily dosages in a particular case will of course be determined according to well-established principles.

It is to be understood that the invention is not to be limited to the exact details of operation or exact compounds, compositions, or procedures shown and described, as obvious modifications and equivalents will be apparent to one skilled in the art, and the invention is therefore to be limited only by the scope of the appended claims.

We claim:

1. An aminolower - alkoxytriarylacrylamide selected from the group consisting of amines having the formula:

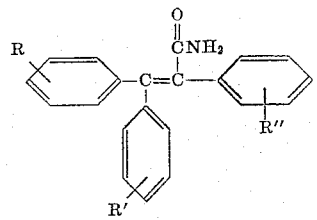

wherein R is selected from the group consisting of hydrogen, lower-alkyl, lower-alkoxy, halogen, trifluoromethyl and dilower-alkylamino, and wherein R' and R'' are independently selected from the group consisting of hydrogen, lower-alkyl, lower-alkoxy, halogen, trifluoromethyl, dilower-alkylamino, hydroxy, and aminolower-alkoxy —O—A—NR$^1$R$^2$, in which A is lower-alkylene, and in which R$^1$ and $R^2$ are independently selected from the group consisting of lower-alkyl, phenyl and benzyl, and together with the nitrogen atom constitute further members of the group consisting of piperidino, pyrrolidino, morpholino, piperazino, N-lower-alkylpiperazino, and C-lower-alkyl derivatives thereof, at least one of R' and R" being aminolower-alkoxy, an acid addition salt thereof, an N-oxide thereof, and an acid addition salt of an N-oxide thereof.

2. A compound selected from the group consisting of 3,3 - diphenyl - 2 - (dilower - alkylaminolower - alkoxyphenyl)acrylamide and pharmaceutically acceptable acid addition salts thereof.

3. A compound selected from the group consisting of 2,3 - diphenyl - 3 - (dilower - alkylaminolower - alkoxyphenyl)acrylamide and pharmaceutically acceptable acid addition salts thereof.

4. A compound selected from the group consisting of 3,3 - bis(lower - alkoxyphenyl) - 2 - (dilower - alkylaminolower-alkoxyphenyl)acrylamide and pharmaceutically acceptable acid addition salts thereof.

5. A pharmaceutically acceptable acid addition salt of 2 - [4 - (2 - diethylaminoethoxy)phenyl] - 3,3 - diphenylacrylamide.

6. A pharmaceutically acceptable acid addition salt of 3,3 - bis(4 - chlorophenyl) - 2 - [4 - (2 - diethylaminoethoxy)phenyl]acrylamide.

7. A pharmaceutically acceptable acid addition salt of 2 - [4 - (2 - diethylaminoethoxy)phenyl] - 3,3 - bis(4-methoxyphenyl)acrylamide.

8. A pharmaceutically acceptable acid addition salt of 2 - [4 - (2 - dimethylaminoethoxy)phenyl] - 3,3 - diphenylacrylamide.

9. A pharmaceutically acceptable acid addition salt of 2 - [4 - (3 - dimethylaminopropoxy)phenyl] - 3,3 - diphenylacrylamide.

10. A pharmaceutically acceptable acid addition salt of 3 - [4 - (2 - diethylaminoethoxy)phenyl] - 2,3 - diphenylacrylamide.

11. 2 - [4 - (2 - diethylaminoethoxy)phenyl] - 3,3 - diphenylacrylamide N-oxide.

12. (Dilower - alkylaminolower - alkoxy)phenyl - diphenylacrylamide N-oxide.

13. An N-oxide acid addition salt of (dilower-alkylaminolower-alkoxy)phenyl-diphenylacrylamide.

References Cited

UNITED STATES PATENTS

| | | | |
|---|---|---|---|
| 2,790,826 | 4/1957 | Bader | 260—559 |
| 2,830,008 | 4/1958 | Barber et al. | 260—559 |
| 3,213,140 | 10/1965 | Mills | 260—558 |

OTHER REFERENCES

Buu-Hoi et al., I Bull. Soc. Chim., France, 1947, pages 816–20.

Buu-Hoi et al., II Jour. Chem. Soc. (London), 1947, pages 641–4.

Corre et al., Chem. Abst., vol. 41, cols. 4137–8 (1947).

Noller, Chemistry of Organic Compounds, 2nd ed., page 137, Philadelphia, Saunders, 1958.

Wagner et al., Synthetic Organic Chem., pages 226–8, New York, Wiley, 1953.

WALTER A. MODANCE, *Primary Examiner.*

N. TROUSOF, *Assistant Examiner.*

UNITED STATES PATENT OFFICE
CERTIFICATE OF CORRECTION

Patent No. 3,361,813                          January 2, 1968

Robert Edward Allen et al.

It is hereby certified that error appears in the above numbered patent requiring correction and that the said Letters Patent should read as corrected below.

Column 2, line 28, for "dilower, alkylamino" read -- and dilower-alkylamino --; column 5, line 11, for "$C_{23}N_{19}NO$" read -- $C_{23}H_{19}NO$ --; line 12, for N, 4,31." read -- N, 4.31. --; column 6, line 32, for "$C_{18}O_{18}O_3$" read -- $C_{18}H_{18}O_3$ --; column 7 line 60, for "C, 78,29" read -- C, 78.29 --; column 10, line 64, for "phenyl)acrylamide" read -- phenyl)acrylamide hydrochloride --.

Signed and sealed this 15th day of April 1969.

(SEAL)
Attest:

EDWARD M. FLETCHER, JR.                      EDWARD J. BRENNER
Attesting Officer                             Commissioner of Patents